(12) United States Patent
Kim et al.

(10) Patent No.: US 8,970,162 B2
(45) Date of Patent: *Mar. 3, 2015

(54) SYSTEM AND METHOD FOR BALANCING ELECTRICAL ENERGY STORAGE DEVICES VIA DIFFERENTIAL POWER BUS AND CAPACITIVE LOAD SWITCHED-MODE POWER SUPPLY

(75) Inventors: Jang Dae Kim, San Jose, CA (US); Jacek Justyn Marcinkowski, San Pedro, CA (US)

(73) Assignee: Texas Instruments Incorporated, Dallas, TX (US)

( * ) Notice: Subject to any disclaimer, the term of this patent is extended or adjusted under 35 U.S.C. 154(b) by 510 days.

This patent is subject to a terminal disclaimer.

(21) Appl. No.: 13/336,695

(22) Filed: Dec. 23, 2011

(65) Prior Publication Data

US 2013/0015821 A1    Jan. 17, 2013

Related U.S. Application Data

(63) Continuation-in-part of application No. 13/180,963, filed on Jul. 12, 2011.

(51) Int. Cl.
  *H02J 7/00*  (2006.01)
(52) U.S. Cl.
  CPC .................................. *H02J 7/0019* (2013.01)
  USPC ......................................... 320/103; 320/163
(58) Field of Classification Search
  CPC ..... H02J 7/0054; H02J 7/0013; H02J 7/0077; H02J 7/008
  USPC .......................... 320/103, 128, 134, 136, 163
  See application file for complete search history.

(56) References Cited

U.S. PATENT DOCUMENTS

| | | |
|---|---|---|
| 5,600,247 A | 2/1997 | Matthews |
| 5,656,915 A | 8/1997 | Eaves |
| 6,150,795 A | 11/2000 | Kutkut |
| 6,577,135 B1 | 6/2003 | Matthews |
| 6,915,220 B2 | 7/2005 | Cardinal |
| 7,564,216 B2 | 7/2009 | Carrier |
| 2008/0061764 A1 | 3/2008 | Tae |
| 2008/0309286 A1 | 12/2008 | Hoff |
| 2009/0130541 A1 | 5/2009 | Emori |
| 2009/0146610 A1 | 6/2009 | Trigiani |
| 2009/0179650 A1 | 7/2009 | Omagari |
| 2009/0289599 A1 | 11/2009 | White |
| 2010/0261048 A1 | 10/2010 | Kim |
| 2013/0015820 A1* | 1/2013 | Kim ............................. 320/128 |

* cited by examiner

*Primary Examiner* — Edward Tso
*Assistant Examiner* — Aaron Piggush
(74) *Attorney, Agent, or Firm* — Andrew Viger; Frederick J. Telecky, Jr.

(57) ABSTRACT

System and method are provided for transferring electrical energy among multiple electrical energy storage devices via multiple differential power buses and capacitive load switched-mode power supplies. The switched-mode power supplies transfer the electrical energy between the load capacitors and the differential power buses to which the electrical energy storage devices (e.g., rechargeable batteries and/or capacitors connected in parallel or series or combinations of both) are electrically connected via bus switches. As a result, electrical energy is efficiently transferred and distributed among the electrical energy storage devices.

4 Claims, 10 Drawing Sheets

SYSTEM AND METHOD FOR BALANCING ELECTRICAL ENERGY STORAGE DEVICES VIA DIFFERENTIAL POWER BUS AND CAPACITIVE LOAD SWITCHED-MODE POWER SUPPLY

RELATED APPLICATION DATA

This application is a continuation-in-part of U.S. patent application Ser. No. 13/180,963, filed Jul. 12, 2011.

FIELD OF THE INVENTION

The present invention relates to electronic circuit techniques for shuttling electrical energy across elements of a circuit via differential power buses and, in particular, to reactive energy shuttling using capacitive load switched-mode power supplies for efficient power distribution.

BACKGROUND

Lithium-ion (including Lithium-ion polymer) batteries are popular in mobile applications due to their high energy density and low self-discharge rate. They have relatively high internal resistance that increases with aging. For high voltage applications, multiple cells are coupled in series into a battery pack. As Lithium-ion batteries cannot be equalized during charging simply by overcharging unlike some other secondary batteries, elaborate cell balancing is essential for such multi-cell Lithium-ion battery systems to cope with cell-to-cell variations such as internal resistance, state-of-charge (SOC), and capacity/energy (C/E) mismatch.

FIG. 1 depicts a flying-capacitor charge shuttling scheme for a battery pack in which multiple battery cells B1, B2, and B3 are coupled in series. It employs a capacitor C to transfer charge from a high voltage cell to a low voltage cell via a differential power bus (Vbus, Vbus'). Switches S1, S2, S3, S4, S5, and S6 are provided to connect the batteries to the power bus, connecting only one cell at a time to the power bus. The 'flying-capacitor' C is connected directly across the differential power bus (Vbus, Vbus'). Connecting it to a high voltage cell via the power bus charges the capacitor C; subsequently connecting to a low voltage cell discharges it, thereby transferring energy from the high voltage cell to the low voltage cell, consequently equalizing them.

Such flying-capacitor charge shuttling is energy-efficient only when the voltage differences between cells are small because the energy transfer efficiency is the ratio of low cell voltage to high cell voltage. If the voltage differences grow, the energy efficiency of the flying-capacitor charge shuttling plummets. For example, if the high cell voltage is 4V and the low cell is 3V, the energy efficiency of the flying-capacitor charge shuttling is no more than 75%. The rest 25% of the energy is dissipated into heat, as the charge transfer to and from the flying-capacitor is resistive.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal.

As discussed in more detail below, a system and method are provided for transferring electrical energy among multiple electrical energy storage devices via a differential power bus. A capacitive load switched-mode power supply transfers the electrical energy between a load capacitor and the differential power bus to which the electrical energy storage devices (e.g., rechargeable batteries and/or capacitors connected in parallel or series or combinations of both) are connected. As a result, electrical energy is efficiently transferred and distributed among the electrical energy storage devices.

Figure 1:
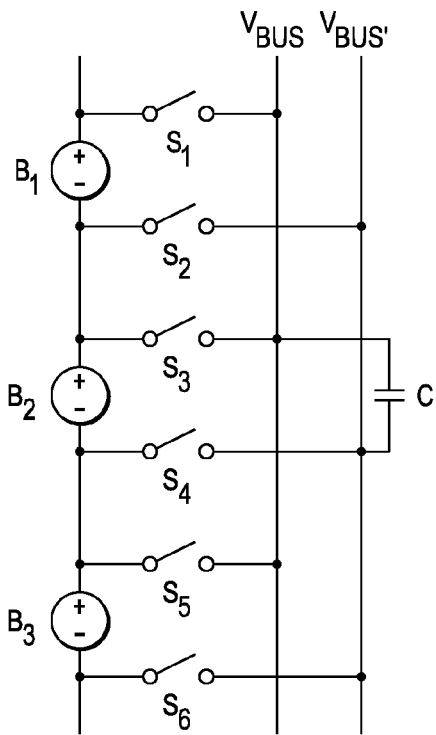
FIG. 1 depicts a flying-capacitor charge shuttling technique for cell balancing.
Figure 2:
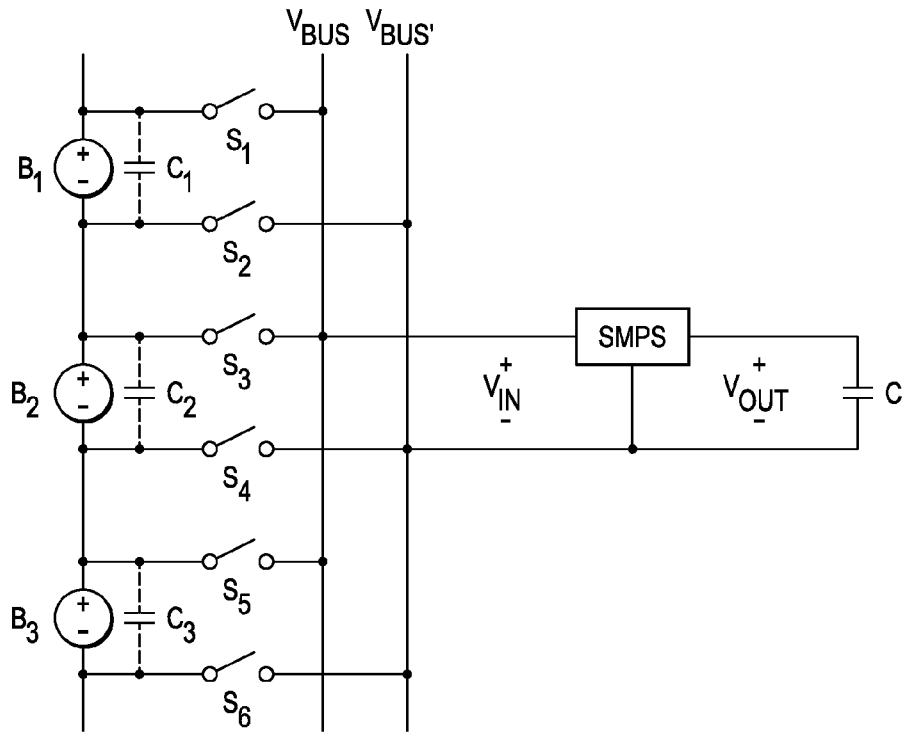
FIG. 2 depicts capacitor-load SMPS energy shuttling technique for cell balancing.

Flying-capacitor charge shuttling dissipates substantial energy into heat due to resistive charging and discharging of the flying-capacitor (a reactive load) via a differential power bus. The presently claimed invention provides reactive charging and discharging of the load capacitor by employing a switched-mode power supply (SMPS, or simply switcher) such as a synchronous buck or boost converter for efficient power transfer/distribution via the differential power bus. In other words, the flying-capacitor C of FIG. 1 is replaced by a capacitor-load SMPS for reactive charging and discharging of the load capacitor C as depicted in FIG. 2. The differential power bus (Vbus, Vbus') multiplexes battery cells B1, B2, and B3 by using bus switches S1, S2, S3, S4, S5, and S6 to selectively connect them to the switcher SMPS, thereby providing an input power supply (Vin) for the switcher SMPS. As the capacitor-load SMPS (the switcher with load C) ideally does not consume energy, it serves as an efficient energy shuttle between the cells (by picking up energy from a cell and then dumping the energy back to another) thereby equalizing/balancing them. Capacitors C1, C2, and C3 may be coupled with battery cells B1, B2, and B3, respectively, to buffer energy (even when a cell is dead with high internal resistance). The SMPS-based energy shuttle can accommodate large voltage differences/changes on the differential power bus without much impacting efficiency of the energy shuttle unlike flying-capacitor charge shuttling. Thus, a single cell or multiple series-cells (even the entire battery pack cells) can be connected to the power bus for reactive energy shuttling.

Figure 3:
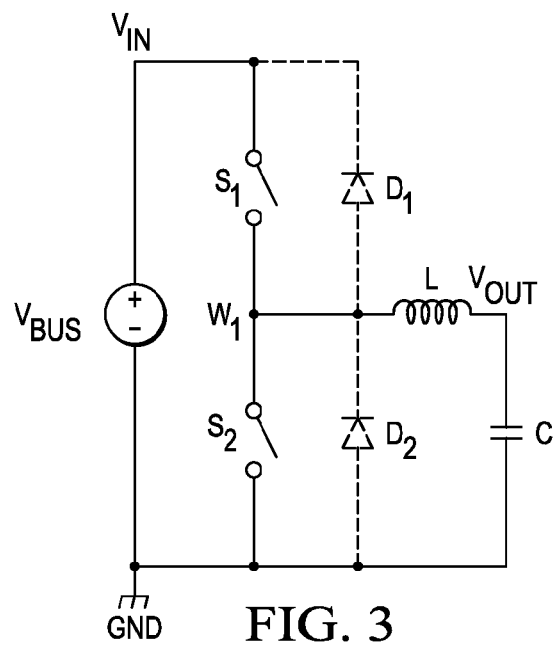
FIG. 3 depicts an ideal synchronous buck converter energy shuttle circuit.

FIG. 3 depicts an idealized synchronous buck converter circuit employing ideal switches. It consists of three branches: a first branch consisting of a voltage source Vbus and a first switch S1 coupled in series, a second branch consisting of a second switch S2 that is synchronously operating complementary to the first switch S1, and a third branch consisting of an inductor L and a capacitor-load C coupled in series. The three branches are coupled in parallel, one of the two terminal nodes being designated as a ground GND and the other being a switching node w1 with respect to the ground. The voltage source Vbus represents the differential voltage across the differential power bus (Vbus, Vbus') of FIG. 2. Diodes D1 and D2 are coupled in parallel with the switches S1 and S2, respectively, in FIG. 3, assuming that the voltage source Vbus is positive, to continuously provide positive current paths for the third branch during dead time that both switches are OFF; the diodes' directions flip if Vbus is negative. Although the order of elements in a branch can be arbitrary, it is assumed that the input voltage source Vbus and the output load are ground referenced. Vin and Vout represent the voltages across the voltage source Vbus, and the load capacitor C, respectively, with respect to the ground GND. For purposes of idealized analyses herein, it is assumed that the states of the ideal switches S1 and S2 are complementary at all time (i.e., no dead time for the diodes D1 and D2 to function).

As the switches S1 and S2 are rapidly switching the states with duty cycle D per S1's ON state (and S2's OFF state), current flows in the third branch through the inductor L and the load capacitor C. When the switch S1 is in the ON state (i.e., closed), the inductor branch current flows from the first branch as the switch S2 is in the OFF state (i.e., opened). During this time, the current is increasing in the rate proportional to (Vin-Vout). When the switch S1 is in OFF state (i.e., opened), the inductor branch current continues to flow through the switch S2 (which is in ON state) of the second branch. This time, the current is decreasing in the rate proportional to Vout. In steady state, the current increment of the ON state and decrement of the OFF state balance out. That is, $(Vin-Vout)*D=Vout*(1-D)$ Thus, $Vin*D=Vout$ or $Vout/Vin=D$ As the duty cycle D is no greater than 1, Vout<=Vin (thus the name "buck" or "step-down" converter). Note that the steady-state relationship of (Vout=Vin*D) is irrespective of the input circuit (voltage source Vbus here) or the output circuit (capacitor C here). In other words, any Vout voltage between 0V and Vin can be obtained by appropriately modulating the duty cycle D. By ramping Vout voltage up (but still under Vin voltage), the load capacitor C picks up energy from Vbus (actually from a cell or cells connected to the differential power bus at the moment); by ramping Vout voltage down, the saved energy in the load capacitor C is dumped back to Vbus (eventually to a cell or cells connected to the differential power bus at the moment).

In practice, changing the states of the switches S1 and S2 cannot be instantaneous. It takes a finite time for a control signal to change the state of a switch, and a finite dead time of both switches being OFF safeguards against short-circuiting Vbus. During this dead time, one of the diodes D1 and D2 provides a positive path for the inductor current to continue to flow; charging (the load capacitor C) current will flow via the diode D2, and discharging current will flow via the diode D1. The buck-converter based energy shuttle is rather limited because of the restriction (Vin≥Vout). That is, Vout should be no greater than the lowest cell voltage. A large load capacitor is needed to shuttle a substantial amount of energy; handling the quadratic amount of charge will also slow down the shuttling, needing large transistors for the switches S1 and S2.

Figure 4:
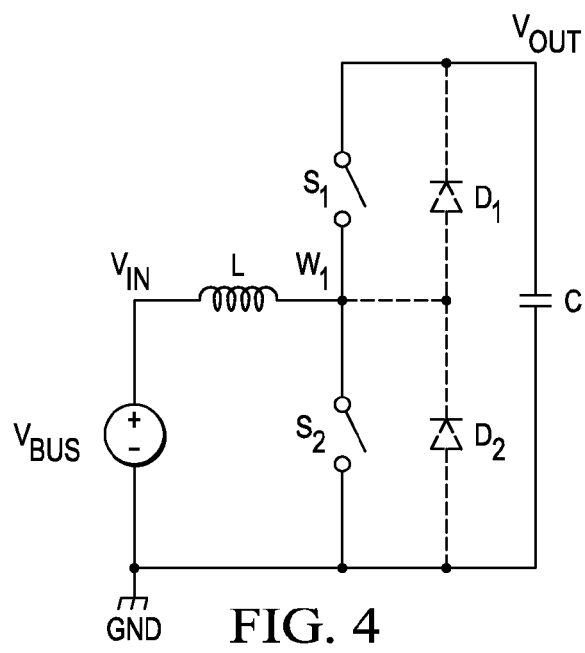
FIG. 4 depicts an ideal synchronous boost converter energy shuttle circuit.

FIG. 4 depicts an idealized synchronous boost converter circuit, again employing ideal switches. It consists of three branches: a first branch consisting of a load-capacitor C and a first switch S1 coupled in series, a second branch consisting of a second switch S2 that is synchronously operating complementary to the first switch S1, and a third branch consisting of an inductor L and a voltage source Vbus coupled in series. The three branches are coupled in parallel, one of the two terminal nodes being designated as the ground GND and the other being a switching node w1 with respect to the ground. The voltage source Vbus represents the differential voltage across the differential power bus (Vbus, Vbus') of FIG. 2. Diodes D1 and D2 are coupled in parallel with the switches S1 and S2, respectively, in FIG. 4, assuming that the Vin voltage source is positive, to continuously provide positive current paths for the third branch during dead time that both switches are OFF; the diodes' directions flip if Vbus is negative.

The boost converter circuit of FIG. 4 is the same as the buck converter circuit of FIG. 3 except that Vin and Vout are swapped with each other along with the voltage source Vbus and the load capacitor C, respectively. The buck and boost converters are dual of each other per the perspective of the input (Vin) and output (Vout). Thus, a similar steady-state relationship of (Vin=Vout*D) or (Vout=Vin/D) applies here where the duty cycle D is per S1's ON state (and S2's OFF state). As the duty cycle D is no greater than 1, Vin<=Vout (thus the name "boost" or "step-up" converter). The bi-directional synchronous buck (or boost) converter can be considered as two unidirectional converters of opposite directions superposed, sharing the inductor L and the load capacitor C. For example, the FIG. 3 circuit without the lower switch S2 is a forward buck converter; and the FIG. 3 circuit without the upper switch S1 is a backward boost converter. Two separate unidirectional converters of opposite directions, sharing the load capacitor C but not sharing the inductor L, coupled in parallel will also do. Note that the steady-state relationship of (Vout=Vin/D) is irrespective of the input circuit (voltage source Vbus here) or the output circuit (capacitor C here). In other words, any Vout voltage greater than or equal to Vin can be obtained by appropriately modulating the duty cycle D. By ramping Vout voltage up, the load capacitor C picks up energy from Vbus (actually from a cell or cells connected to the differential power bus at the moment); by ramping Vout voltage down (but no less than Vin voltage), the saved energy in the load capacitor C is dumped back to Vbus (eventually to a cell or cells connected to the differential power bus at the moment). The boost converter based energy shuttle is more flexible to use with the restriction (Vin≤Vout). That is, it can accommodate even a dead cell (Vin near 0V) or the entire battery pack for Vin as long as Vout is kept high enough. Moreover, the boost controller may be self-powered directly by Vout.

Figure 5:
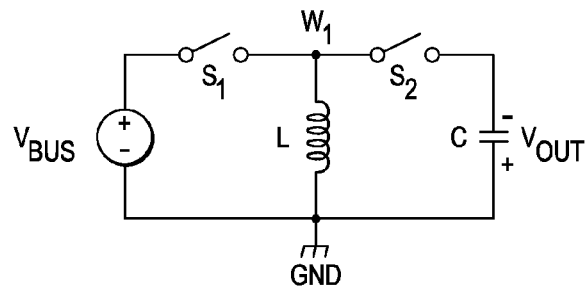
FIG. 5 depicts an ideal synchronous buck-boost converter energy shuttle circuit.
Figure 6:
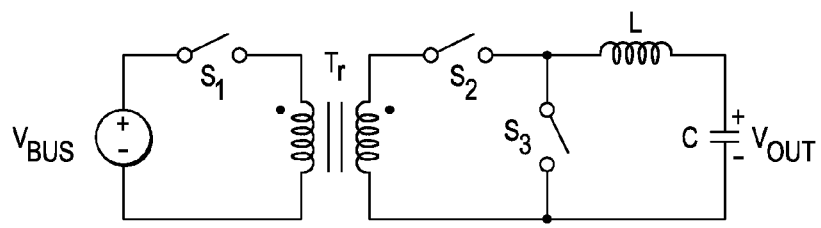
FIG. 6 depicts an ideal synchronous forward converter energy shuttle circuit.

There are various other switched-mode power supplies. FIG. 5 depicts synchronous buck-boost converter based cell balancing circuit. Unlike buck or boost converter based cell balancing circuit, the output voltage Vout is not restrained by the Vbus voltage in this circuit. FIG. 6 depicts a synchronous forward converter based cell balancing circuit. Transformer provides galvanic isolation of the circuits on both sides of the transformer. Other transformer-based isolating converters (such as flyback converter or push-pull converter) also provide galvanic isolation.

Figure 7:
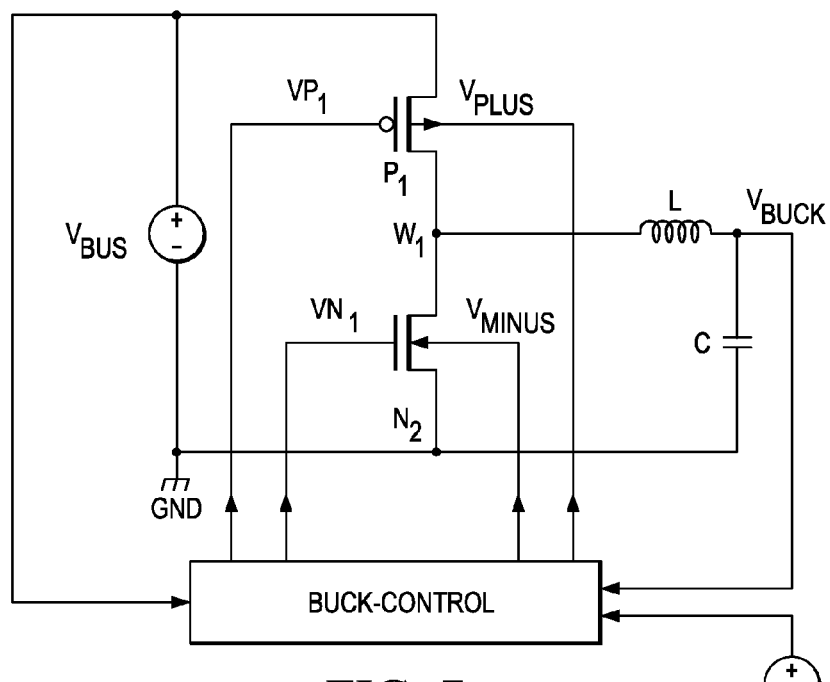
FIG. 7 depicts a CMOS buck converter energy shuttle circuit.

FIG. 7 depicts a synchronous buck converter circuit corresponding to the ideal FIG. 3 circuit by employing MOSFET switches. In accordance with an exemplary embodiment, Vbus represents a piecewise-linear voltage source alternating between 1.75V and 3.5V at a frequency of 6 kHz. P1 represents a PMOS transistor, implementing the upper switch S1, with its n-type substrate biased to a most positive voltage VPLUS. N2 represents an NMOS transistor, implementing the lower switch S2, with its p-type substrate biased to a most negative voltage VMINUS. In accordance with an exemplary embodiment, VPLUS and VMINUS represent 3.5V and −3.5V, respectively, and inductor L and load capacitor C represent 10 uH and 0.1 µF, respectively. VP1 and VN2 represent gate terminal voltages of P1 and N2 transistors, respectively. Buck_control represents a controller providing the switching signals VP1 and VN2 along with the bias signals VPLUS and VMINUS. The signal VP1 swings between VMINUS and Vbus, whereas the signal VN2 swings between VPLUS and 0V. The switching frequency of VP1 and VN2 is order of magnitude higher (e.g., 1000 times) than the frequency of the Vbus voltage. Vref provides a reference signal to Buck_control. In accordance with an exemplary embodiment, it ramps up to 1.4V when Vbus goes to 3.5V and ramps down to 0.4V when Vbus comes back to 1.75V. Buck_control adjusts the duty cycle D in providing the switching signals VP1 and VN2 signals so that the output Vbuck follows the reference Vref in a feedback loop control.

Figure 8:
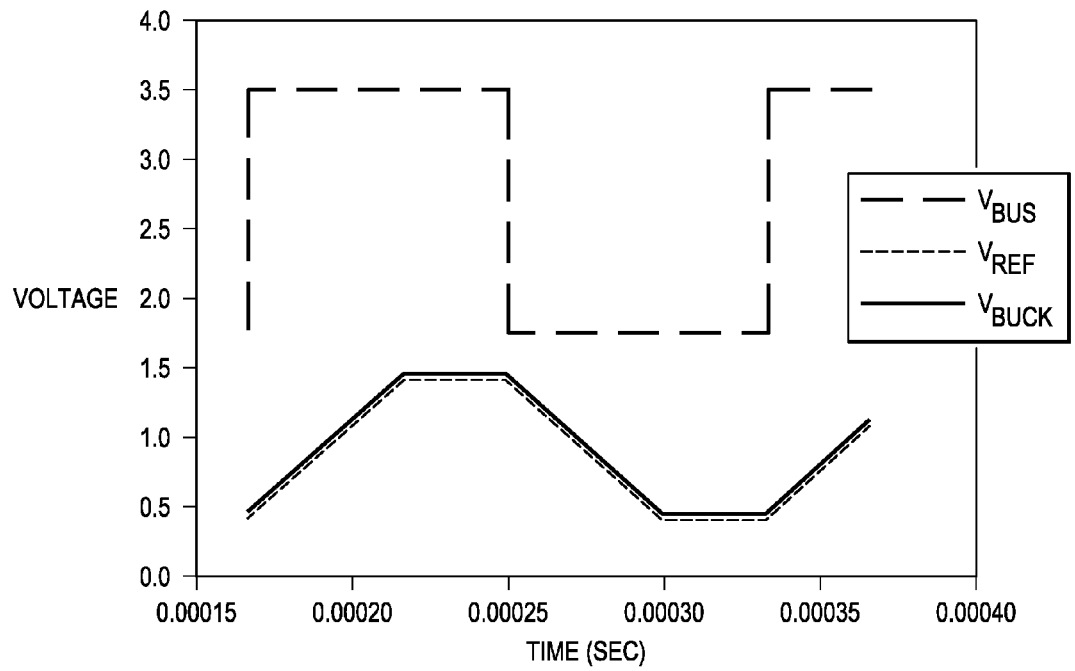
FIG. 8 illustrates simulation results for the circuit of FIG. 7.

FIG. 8 shows simulation results for the circuit of FIG. 7. The output Vbuck follows Vref closely, thereby charging the load capacitor C to 1.4V with a constant current when Vbus goes to 3.5V, and discharging down to 0.4V also with a constant current when Vbus comes back to 1.75V.

Figure 9:
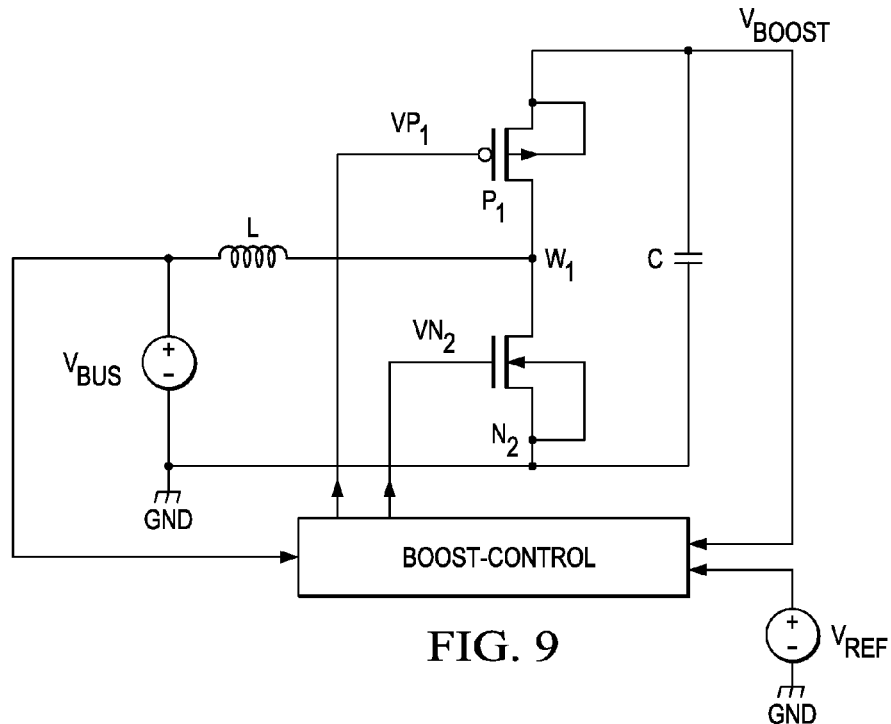
FIG. 9 depicts a CMOS boost converter energy shuttle circuit.

FIG. 9 depicts a synchronous boost converter circuit corresponding to the ideal FIG. 4 circuit by employing MOSFET switches. In accordance with an exemplary embodiment, Vbus represents a piecewise-linear voltage source alternating between 1.75V and 3.5V at a frequency of 6 kHz. P1 represents a PMOS transistor, implementing the upper switch S1, with its n-type substrate connected to the output Vboost. N2 represents an NMOS transistor, implementing the lower switch S2, with its p-type substrate connected to the ground GND. In accordance with an exemplary embodiment, inductor L and load capacitor C represent 1 uH and 0.2 µF, respectively. VP1 and VN2 represent gate terminal voltages of P1 and N2 transistors, respectively. Boost_control represents a controller providing the switching signals VP1 and VN2. The signal VP1 swings between 0V and Vboost, whereas the signal VN2 swings between 3.5V and 0V. The switching frequency of VP1 and VN2 is order of magnitude higher (e.g., 1000 times) than the frequency of the Vbus voltage. Vref provides a reference signal to Boost_control. In accordance with an exemplary embodiment, it ramps up to 5.5V when Vbus goes to 3.5V and ramps down to 3.7V when Vbus comes back to 1.75V. Boost_control adjusts the duty cycle D in providing the switching signals VP1 and VN2 signals so that the output Vboost follows the reference Vref in a feedback loop control.

Figure 10:
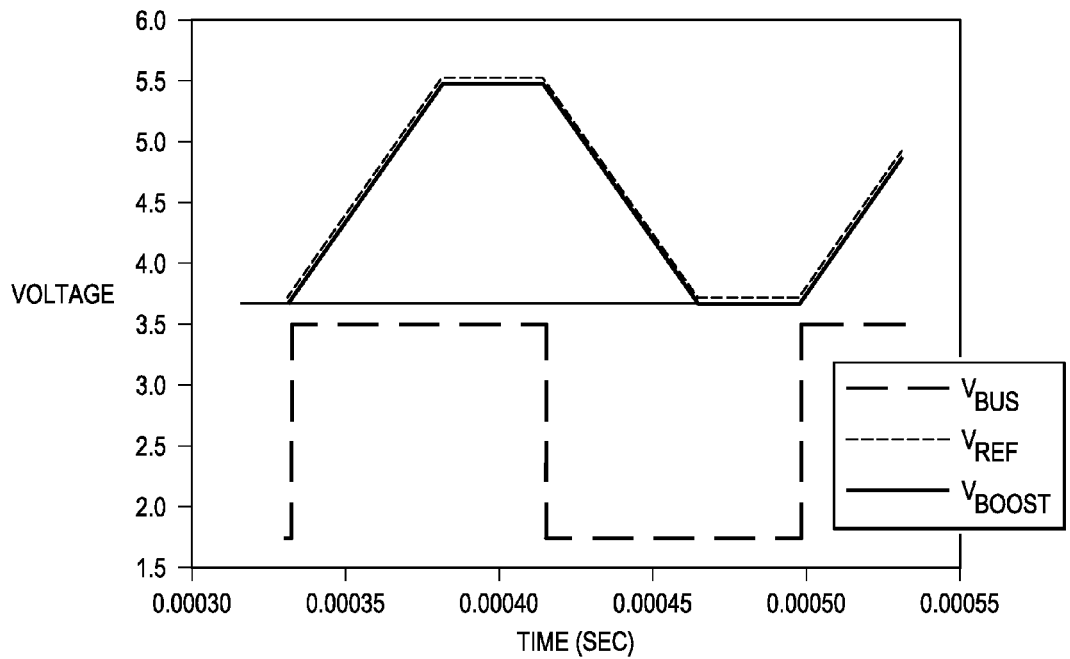
FIG. 10 illustrates simulation results for the circuit of FIG. 9.

FIG. 10 shows simulation results for the circuit of FIG. 9. The output Vboost follows Vref closely, thereby charging the load capacitor C to 5.5V with a constant current when Vbus goes to 3.5V, and discharging down to 3.7V also with a constant current when Vbus comes back to 1.75V.

In the SMPS-based energy shuttling cell balancing of FIG. 2, some cells may only have capacitors without batteries (or such batteries are dead with very high internal resistance). For example, batteries B1 and B2 are removed and capacitors C1 and C2 are in place. In that case, the capacitor-load SMPS shuttles energy from battery B3 to capacitors C1 and C2. The series-coupled cells essentially result in an efficient voltage multiplier. Also, the batteries from all cells can be replaced with corresponding capacitors. If external power is applied to the series-coupled capacitive cells stack and output power is drawn from a capacitive cell, the resulting circuit is essentially a voltage divider. Further, not all of the cells need to be coupled in series. The differential power bus makes the SMPS-based energy shuttling independent of the cells' interconnections.

Figure 11:
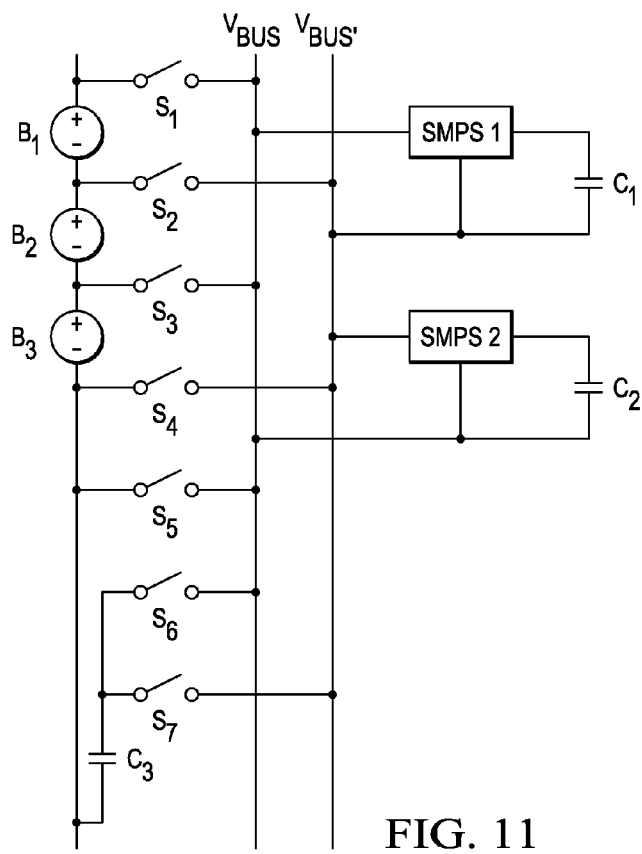
FIG. 11 depicts multiple energy shuttles on a common differential power bus.

We can reduce the number of bus switches as depicted in FIG. 11 by allowing both polarities of differential power bus voltage. Two separate switched-mode power supplies SMPS1 and SMPS2 (with separate load capacitors C1 and C2, respectively) are employed together to support both polarities of differential power bus voltage. They effectively partition battery cells into two parts. A capacitor cell C3 is provided with double bus switches to connect to the differential power bus in either polarity thereby bridging the two parts in transferring energy across the partition.

Figure 12:
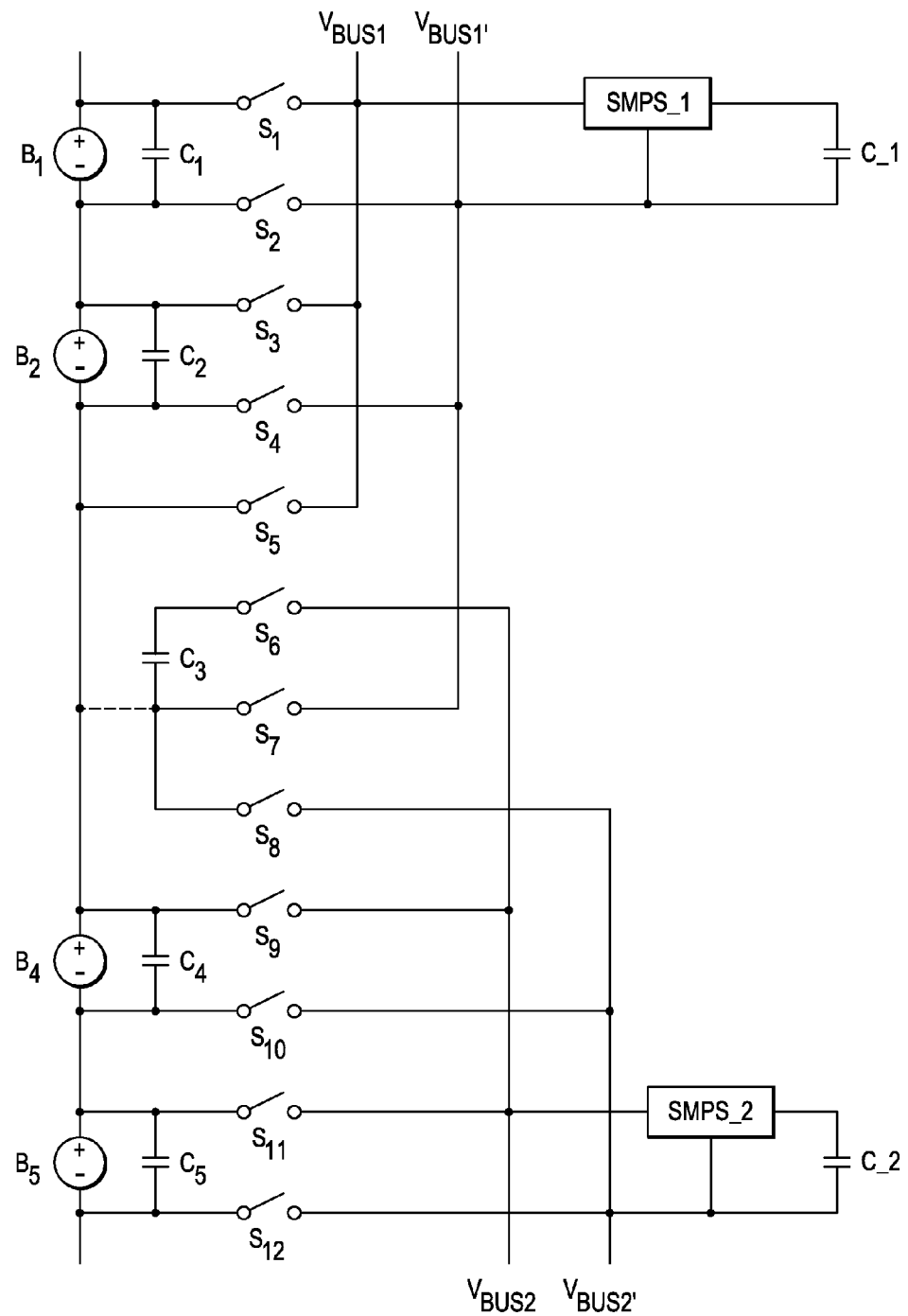
FIG. 12 depicts extended cell balancing with multiple power buses via shared cells.

It is also possible to have multiple differential power buses sharing some or all cells. FIG. 12 depicts such a case where two differential power buses (Vbus1, Vbus1') and (Vbus2, Vbus2') share a capacitive cell C3. (The capacitor C3 is anchored to the node between cells B2 and B4 as indicated by a dotted line.) Each power bus defines a battery management module with its own capacitor-load SMPS energy shuttle. The shared cell C3 enables energy shuttling across the two modules.

Figure 13:
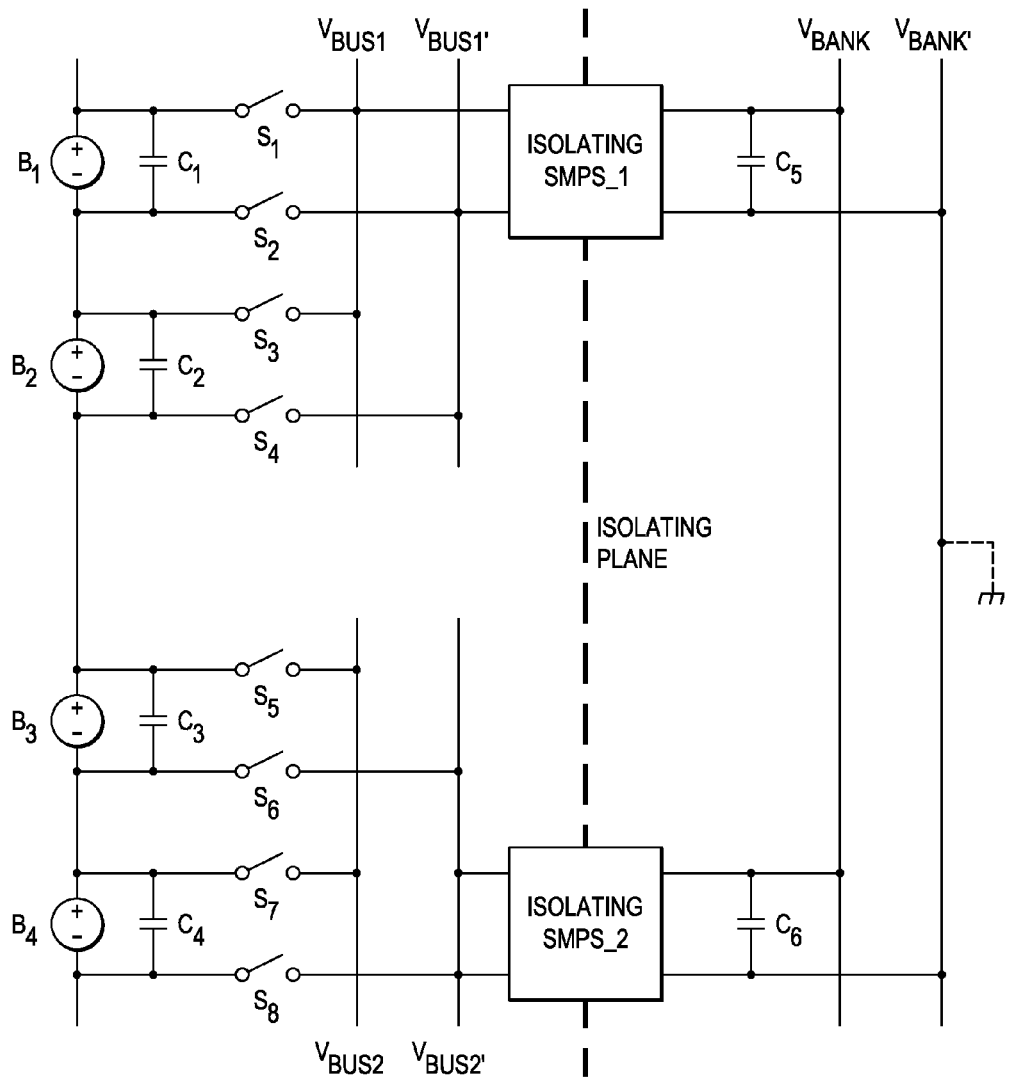
FIG. 13 depicts distributed cell balancing by using transformer-based isolating switched-mode power supplies with shared capacitive load.

FIG. 13 depicts another case where two differential power buses have transformer-based isolating switched-mode power supplies that share the capacitive load bus (Vbank, Vbank') on which distributed capacitors C5 and C6 are coupled across. (The capacitive load bus is anchored to ground as indicated by a dotted line.) Energy is transferred across modules via the shared capacitive load bus.

Figure 14A:
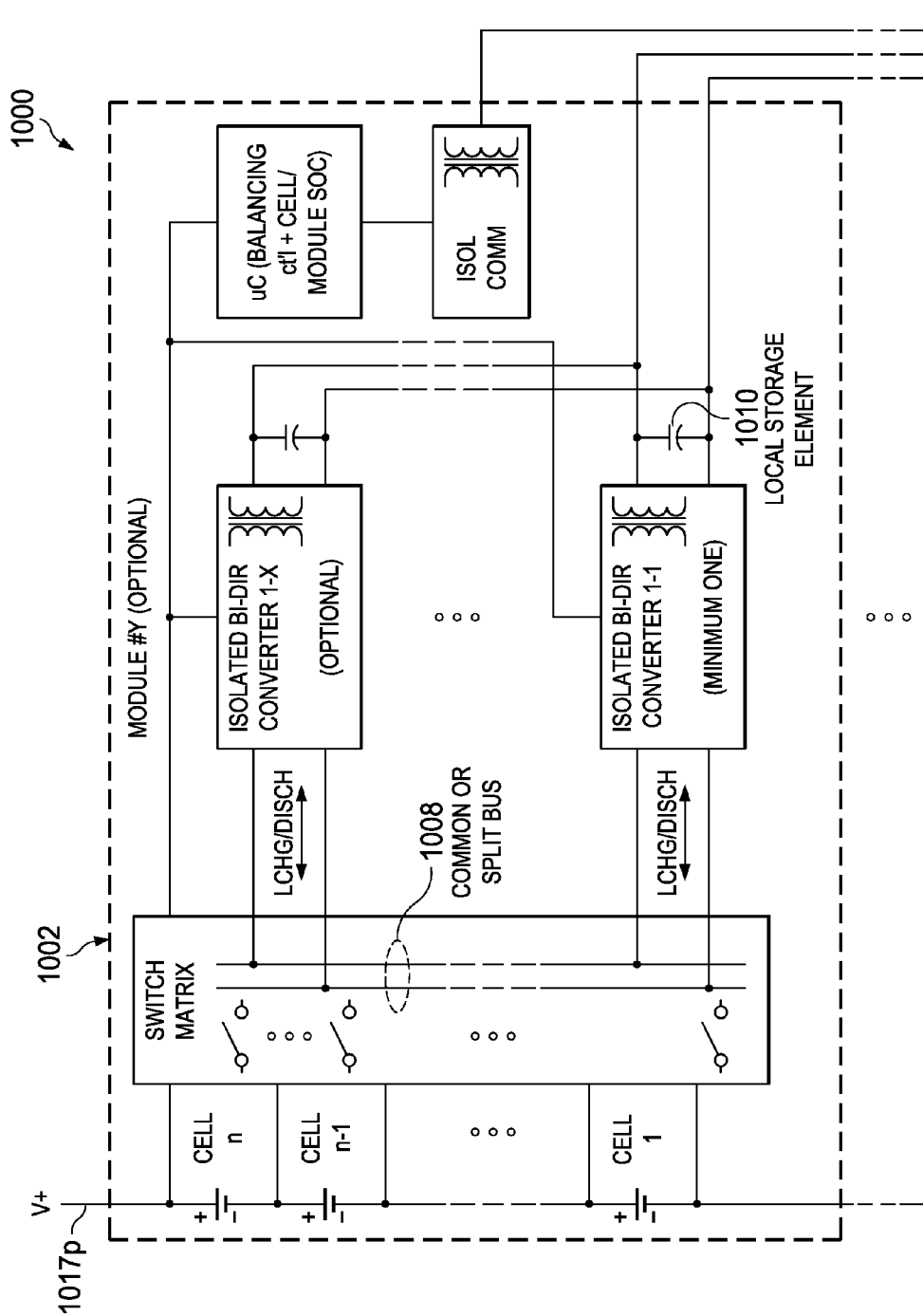
FIG. 14 depicts a battery management system for balancing multiple cells using multiple energy shuttles via a global differential power bus.
Figure 14B:
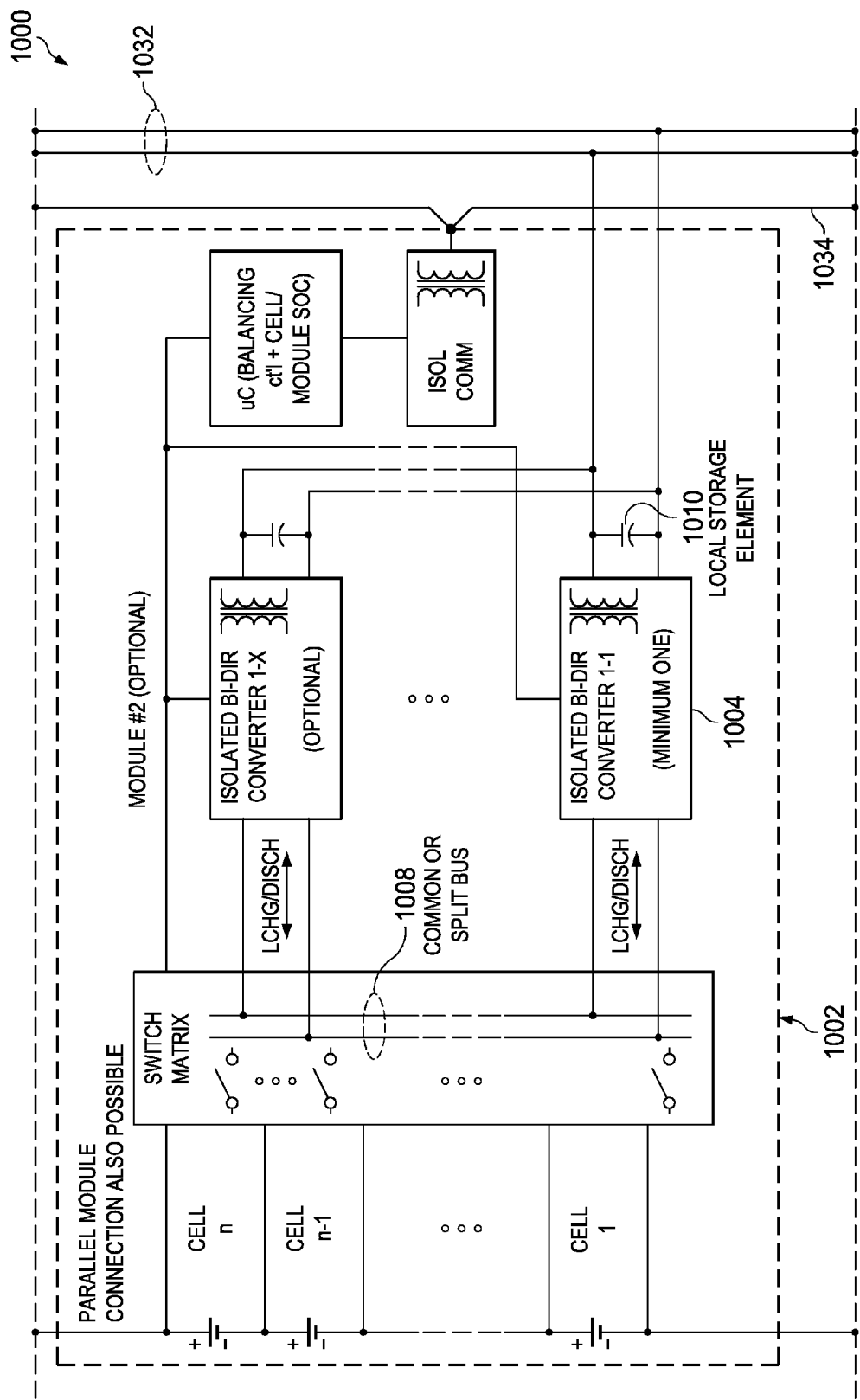
Figure 14C:
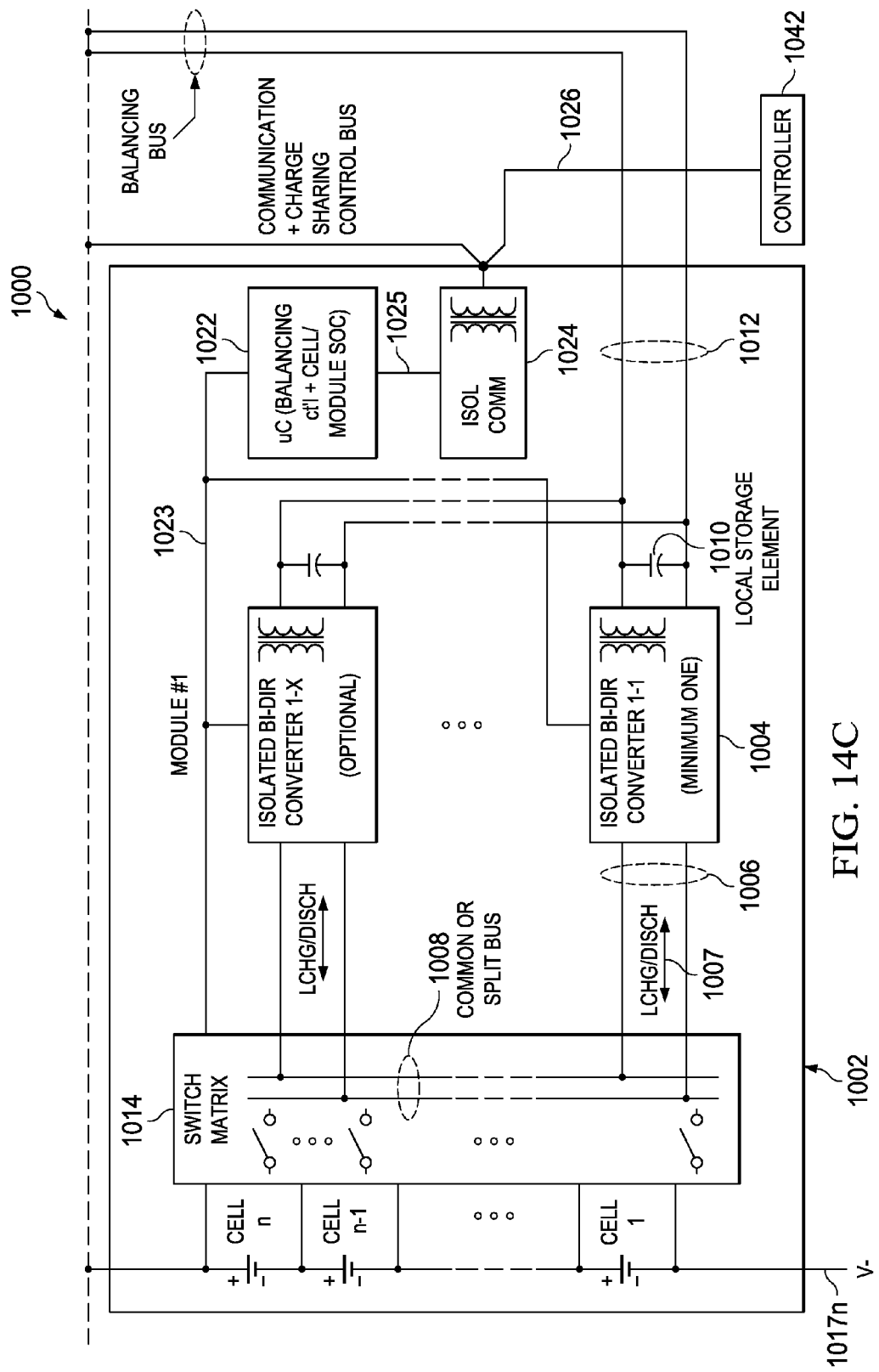

Referring to FIG. 14, energy shuttles, such as those discussed above, can be used as part of a battery management system for balancing multiple battery cells via a global differential power bus. In particular, a battery management system can be implemented that eliminates the need for separate module-to-module balancing circuitry through the use of a common power transfer bus (e.g., the global differential power bus) for simultaneous balancing of cells in all modules to an average level. Such a system topology allows for building standard battery modules containing multiple cells and combining such modules using series or parallel (or series-parallel) connections to form a multi-module battery pack. A balancing algorithm can be used for simultaneous balancing of the cells in all modules across the entire battery pack while maintaining a substantially constant voltage on the global differential power bus. The cells can be balanced directly to the battery pack average (as opposed to first balancing cells within a module and then balancing the modules using separate balancing circuitry). A common control communication bus (e.g., using digital or analog communication signals) provides for information exchange across the battery modules on the state of charge (SOC) of battery cells. The SOC of the battery cells can be estimated locally at the module level and communicated to other modules via the global control bus 1034. Such an arrangement allows for balancing of cells without requiring interaction with a central controller 1042. Energy is exchanged between the cells and the isolated storage elements (capacitors). The storage elements of all the modules are connected in parallel, thus allowing for energy transfer from any cell in the battery pack to any other cell in the pack, regardless of the module boundary.

In accordance with an exemplary embodiment 1000, multiple modules 1002 containing energy shuttles such as those discussed above, are used to monitor and balance energy among the multiple cells 1016 via respective local differential power buses 1008 and a global differential power bus 1032. As discuss above, isolating switched-mode power supplies 1004 are coupled via their local differential power buses 1008 to convey the charging and discharging currents 1007 between the battery cells 1016 and storage element 1010. This storage element 1010, i.e., the capacitance as discussed above, is coupled to the global differential power bus 1032.

Local control circuitry includes a local controller 1022 (e.g., a microcontroller) and isolation circuitry 1024 (e.g., using transformer coupling for DC isolation). The isolation circuitry 1024 is coupled to a global control bus 1034. This global control bus 1034 facilitates communications of the multiple modules 1002 between the modules 1002 and with a central controller 1042 which provides for overall system control. Commands and data to and from the central controller 1042 communicated via the global control bus 1034 are isolated by the isolation circuitry 1024 and conveyed to and from the local controller 1022. The local controller 1022 provides the local control signals to and receives local data from the isolating switched-power supplies 1006 and switch matrix 1014, which provides the necessary connection between the battery cells 1016 and the local differential power bus 1008 (as discussed above). (The local differential power bus 1008 can be a common bus or a split bus.)

As noted above, the modules 1002 can be mutually coupled in series or parallel (or series-parallel) between the electrodes 1017p, 1017n via which the energy stored within the cells 1016 is to be provided to an external load (not shown). An external load (not shown) can also be coupled across the global differential power bus that provides a substantially constant voltage on it.

It should be understood that the particular embodiments of the invention described above have been provided by way of examples and that other modifications may occur to those skilled in the art without departing from the scope and spirit of the invention as express in the appended claims and their equivalents.

What is claimed is:

1. An apparatus including circuitry for transferring electrical energy among multiple electrical energy storage devices, comprising:
    a first differential power bus;
    a first plurality of electrical storage devices;
    a first plurality of multiplexing switches responsive to a first plurality of multiplexing control signals to multiplex said first plurality of electrical storage devices to said first differential power bus;
    a second differential power bus;
    a second plurality of electrical storage devices;
    a second plurality of multiplexing switches responsive to a second plurality of multiplexing control signals to multiplex said second plurality of electrical storage devices to said second differential power bus;
    a first and a second shuttle capacitors respectively coupled to a capacitive load bus;
    a first isolated bidirectional switched-mode power supply coupled between said first differential power bus and said first shuttle capacitor and responsive to duty cycle control signals by transferring first electrical energy between an electrical energy storage device multiplexed to said first differential power bus and said first shuttle capacitor; and
    a second isolated bidirectional switched-mode power supply coupled between said second differential power bus and said second shuttle capacitor and responsive to duty cycle control signals by transferring second electrical energy between an electrical energy storage device multiplexed to said second differential power bus and said second shuttle capacitor;
    such that energy is transferred between said first and said second plurality of electrical storage devices via said capacitive load bus.

2. The apparatus of claim 1, wherein said first and said second isolated bidirectional switched-mode power supplies each comprises one of a synchronous flyback converter, a synchronous forward converter and a synchronous push-pull converter.

3. The apparatus of claim 1, wherein said first and said second plurality of electrical energy storage devices each comprises an electrical battery.

4. The apparatus of claim 3, further comprising a buffer capacitance coupled across each of said first and said second plurality of electrical storage devices.

* * * * *